United States Patent [19]

Hosono et al.

[11] Patent Number: 4,870,572

[45] Date of Patent: Sep. 26, 1989

[54] MULTI-PROCESSOR SYSTEM

[75] Inventors: Yoshimasa Hosono; Toshio Uno, both of Kanagawa, Japan

[73] Assignee: Sony Corporation, Japan

[21] Appl. No.: 839,692

[22] Filed: Mar. 13, 1986

[30] Foreign Application Priority Data

Mar. 15, 1985 [JP] Japan .................................. 60-51995

[51] Int. Cl.⁴ ........................ G06F 15/16; G06F 13/00
[52] U.S. Cl. .................................. 364/200; 364/229; 364/239; 364/241.7
[58] Field of Search ... 364/200 MS File, 900 MS File

[56] References Cited

U.S. PATENT DOCUMENTS

| | | | |
|---|---|---|---|
| 3,618,045 | 11/1971 | Campbell et al. | 364/200 |
| 3,639,912 | 2/1972 | Campbell | 364/200 |
| 3,735,360 | 5/1973 | Anderson et al. | 364/200 |
| 3,845,474 | 10/1974 | Lange et al. | 364/200 |
| 3,889,237 | 6/1975 | Alferness et al. | 364/200 |
| 4,056,844 | 11/1977 | Izumi | 364/200 |
| 4,164,787 | 8/1979 | Aranguren | 364/200 |
| 4,443,846 | 4/1984 | Adcock | 364/200 |

Primary Examiner—David Y. Eng
Attorney, Agent, or Firm—Philip M. Shaw, Jr.

[57] ABSTRACT

Two or more processors with differing address space sizes are used in a multi-processor system. A portion of the memory means accessible by the first processor with a larger address space size is also accessible by the second processor for elevating a utilization efficiency of the memory capacity. A window for the memory space of the second processor is provided in the address space of the first processor. The memory devices controlled by the second processor are controlled through this window by the first processor as well for elevating the utilization efficiency of the memory devices.

11 Claims, 3 Drawing Sheets

MULTI-PROCESSOR SYSTEM

BACKGROUND OF THE INVENTION

1. Field of the Invention

This invention relates to a multi-processor system making use of two or more processors.

2. Description of the Prior Art

There have been provided in the prior art a variety of multi-processor systems making use of a plurality of processors or what are called CPUs. In general, the processors employed in these systems are comparable in their functions or performance.

When it is desired that a variety of software artifices evolved in connection with e.g. an 8-bit CPU computer system be simultaneously used in a 16-bit CPU system having improved functional properties, it is necessary to evolve a multi-processor system with an improved compatibility (or convertibility) between the 8-bit CPU and the 16-bit CPU having widely different functions and above all the address space sizes.

When designing a multi-processor system which employs plural processors with widely differing properties and address space sizes, such as 8-bit and 16-bit CPUs, it is not desirable that the main memory be commonly accessed by the respective processors, because then the main memory capacity is limited by the 8-bit CPU to having a smaller address size so that the excellent properties of the 16-bit CPU are not displayed sufficiently. It is also not desirable to have an independent main memory in each CPU because then the memory utilization efficiency would be lowered.

Memory devices with a memory capacity larger than that corresponding to the address space of an 8-bit CPU system can be controlled by the 8-bit CPU system by resorting to, for example, what is called memory bank commutation or memory banking. However, if these memory devices are simultaneously controlled by the 16-bit CPU, interfacing with the various memory devices will be necessary, thus increasing the system complexity. Moreover, address space allocation must be performed for each memory device, resulting in a correspondingly reduced address space of the 16-bit CPU.

OBJECTS AND SUMMARY OF THE INVENTION

It is therefore an object of the present invention to provide a multi-processor system making use of plural processors with differing address space sizes wherein the memory means can be used in common without placing restrictions on the address space of the higher function processor, the memory devices controlled by the lower function processor may also be easily controlled by the upper function processor, the address space restriction may be eliminated and wherein a software artifice which has evolved and been marketed for use with the lower function processor system may be made available so that an improved compatibility may be realized without functionally deteriorating the higher function processor.

According to a first feature of the present multi-processor system, there are provided at least a first processor having a first address space, a second processor having a second address space which is narrower than that of said first processor, memory means accessible by said first processor, means for accessing said memory means by said first processor, and means for allocating a portion of said memory means to said second processor for accessing of said portion of said memory means by said second processor.

According to a second feature of the present multi-processor system, there is additionally provided in said first address space a window associated with the address space for the memory devices controlled by said second processor in such a manner that said memory devices will be controlled through said window by said first processor.

A portion of the memory means accessed by the first processor, which has a larger address space, is allotted to the second processor as memory means for accessing by said first processor. The memory devices to be controlled by the second processor are controlled by the first processor through the window provided in the associated access space.

In accordance with the present multi-processor system, making use of a plurality of processors having different address space sizes and drastically different functions, an existing software artifice developed in connection with a system making use of only one of the processors can be used so as to provide for full system convertibility and without functionally deteriorating the other processor. In addition, the memory utilization efficiency can be elevated since the portion of the memory means accessed by one of the processors is also accessible by the other processor. The memory devices can be controlled by one processor through the window and thus via the same route as that used in the case of controlling through the other processor. In this manner, the larger memory capacity can be managed without restricting the memory capacity of one of the processors, while the memory devices can be advantageously employed in common by the both processors.

Further and other objects and advantages of the present invention will become apparent on reading the following description with reference to the accompanying drawings.

DESCRIPTION OF THE PREFERRED EMBODIMENTS

Figure 1:
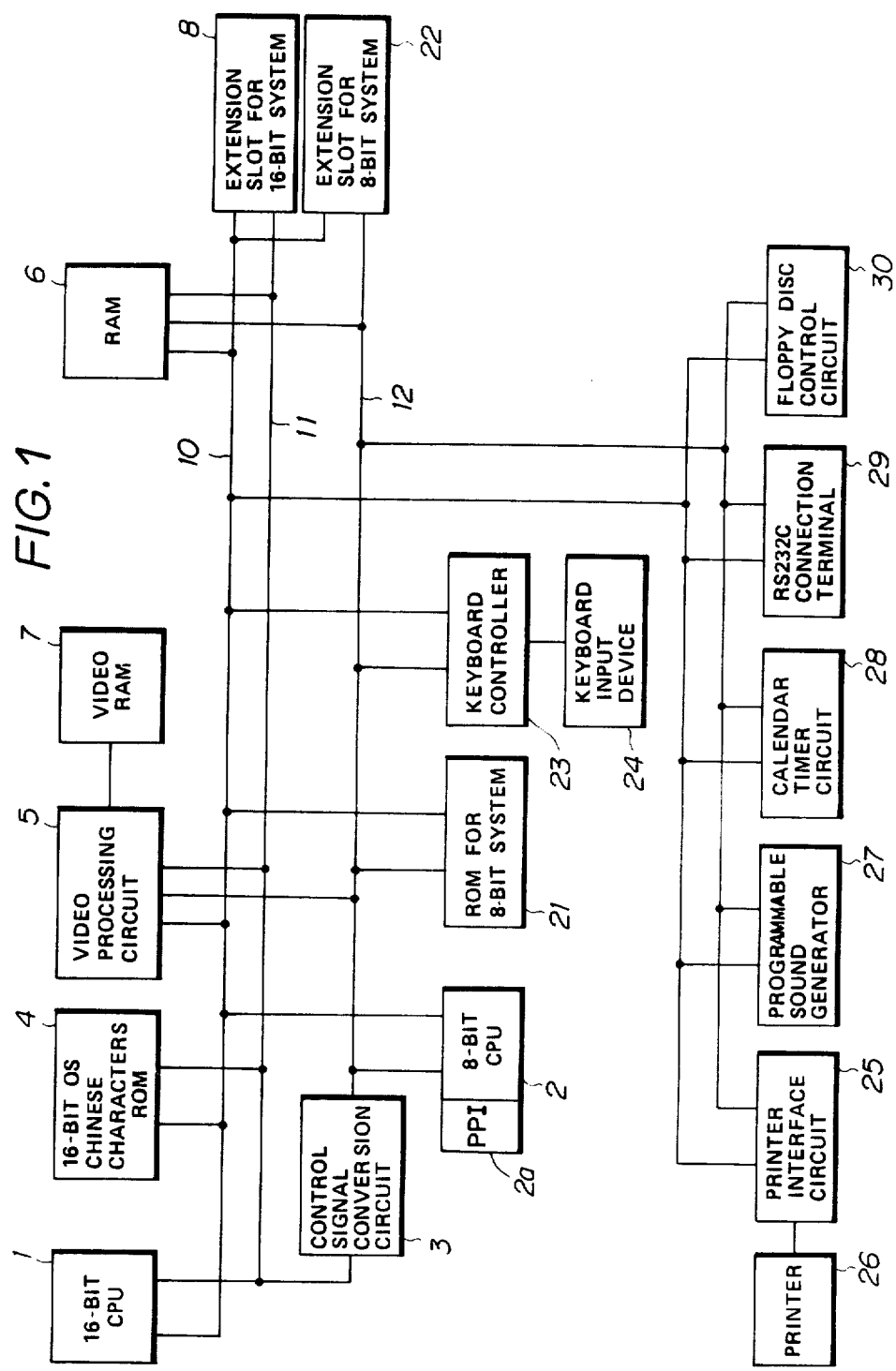
FIG. 1 is a block diagram showing an example of the present invention.

FIG. 1 shows in a block view an embodiment of a multi-processor system of the present invention. The system includes a 16-bit CPU 1 having e.g. a 16M byte memory address space and an 8-bit CPU 2 having a 64K byte memory address space. The 8-bit CPU 2 is designed for constituting an 8-bit CPU system which will satisfy system specifications or standards which have become very popular as the so-called 8-bit personal computer system. During use of the inventive system, the 16-bit CPU 1 and the 8-bit CPU 2 are commutated between each other, as will be apparent hereafter.

In the multi-processor system shown in FIG. 1, an address data bus 10 is used in common by the CPUs 1 and 2. For example, 16 of 24 address lines of the 16-bit CPU 1 are used simultaneously as address lines of the 8-bit CPU 2, while 8 of 16 data lines of the 16-bit CPU 1 are used simultaneously as data lines of the 8-bit CPU 2. It is to be noted that, when these bus lines are timeshared with respect to the upper and lower order address or data portion, the number of the bus lines and/or the status of common use will naturally be changed.

In contrast thereto, the CPUs 1 and 2 are separately provided with control signal buses or control buses. That is, a 16-bit control bus 11 is connected to the 16-bit CPU 1 and an 8-bit control bus 12 is connected to the 8-bit CPU 2. The 16-bit control bus 11 as well as a portion of the address data bus 10 as described later is connected via a control signal conversion circuit 2 to the 8-bit control bus 12.

Figure 2:
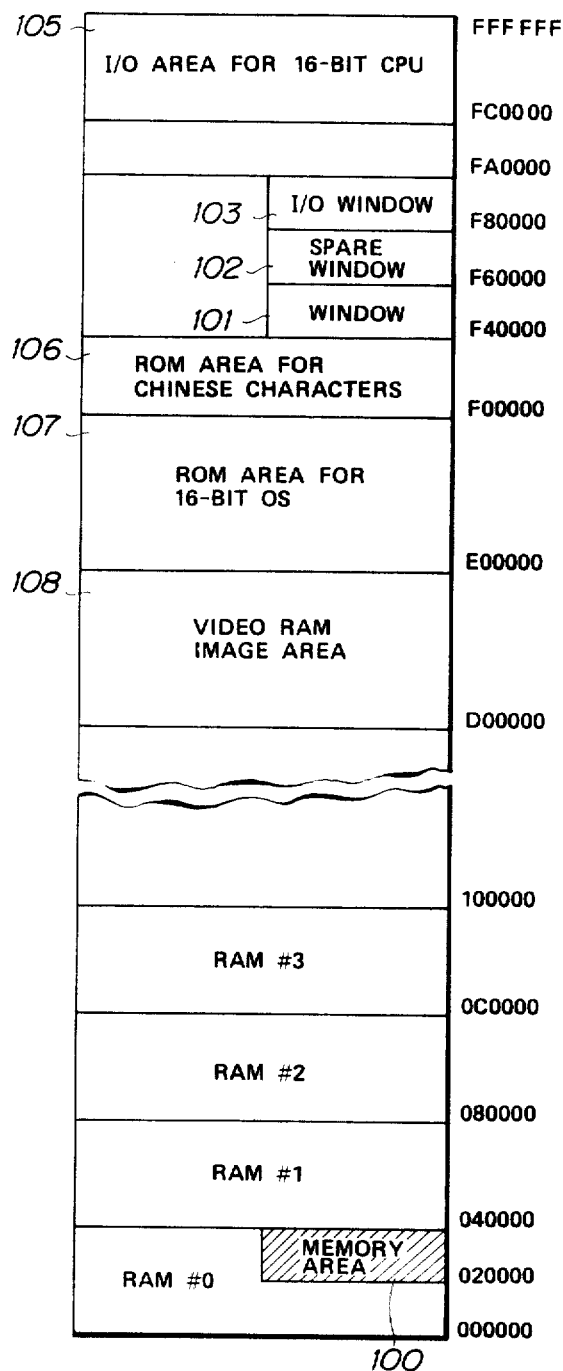
FIG. 2 shows an example of the memory map on the address space of a 16-bit CPU.

The address space of the CPU 1 is made up of 16M bytes, whereas that of the CPU 2 is made up of 64K bytes, only by way of an example. FIG. 2 shows an exemplary memory map in the address space of the 16-bit CPU 1.

Referring to FIG. 2, the RAMs as memory means are provided in units of e.g. 256K bytes starting from the "000000" address in the hexadecimal notation address system. In the drawing, four 256K byte RAMs are provided within a 1M byte area from address "000000" to address "0FFFFF" of these RAM areas. A 64K byte area 100, shown in FIG. 2 by hatched lines and corresponding to even-numbered addresses from "020000" to "03FFFF", is allotted as a RAM for the 8-bit CPU 2 for accessing by the CPU 2. The memory area 100 to be accessed by the 8-bit CPU has been decided so that the lower order byte of a 16-bit (2-byte) word of the CPU 1 will be an 8-bit word. In consideration that one word of the 16-bit CPU 1 consists of 16 bits, each byte of 8 bits is associated with an address for accessing, and the lower and upper order bytes in each word are allotted to even-numbered addresses and to odd-numbered addresses, respectively. As an alternative, the 64K bytes of the even-numbered and odd-numbered consecutive addresses from "030000" to "03FFFF" may naturally be allotted to the 8-bit CPU 2.

In the memory map of FIG. 2, in addition to the RAM area 100 for the 8-bit CPU as described hereinabove, a 64K byte window 101 corresponding to the address space of the 8-bit CPU 2 is provided to an area corresponding to even-numbered consecutive addresses from e.g. "F40000" to "F5FFFF". The 16-bit CPU 1 is able to control, through the window 101, the memory devices etc. placed under management of the CPU 2, as will be described hereinafter. In a 64K byte area consisting of the even-numbered addresses from "F60000" to "R7FFFF", spare window 102 is provided for the address space for the 8-bit CPU 2. In the 64K byte area consisting of the even-numbered addresses from "F80000" to "F9FFFF", there is provided a window 103 for the I/O space for the 8-bit CPU 2.

In the 16M byte address space accessed by the 16-bit CPU 1, there are also provided, for example, an I/O area 105 for the 16-bit CPU 1, a ROM area 106 for Chinese characters, a ROM area 107 for an operating system for the 16-bit CPU system, and a video RAM image area 108.

Referring again to FIG. 1 a ROM 4 is provided in association with these ROM areas 106 and 107 and connected to the address data bus 10 and the 16-bit control bus 11. A video processing circuit 5 and a RAM 6 are connected to these buses 10, 11 and 12 so as to be used in common by the CPUs 1 and 2. To the video processing circuit 5 is connected a video RAM 7 associated with the aforementioned area 108. An extension slot 8 for the 16-bit system is also provided for connecting various other devices to the address data bus 10 and to the 16-bit control bus 11.

Although not shown, inside of the 16-bit CPU 1, there is provided a memory management unit (MMU) for accessing the memory devices, such as RAM 6, that are provided in the aforementioned 16M byte address space.

To the 8-bit CPU 2 are annexed a hardware architecture and a system software capable of satisfying, for example the existing 8-bit CPU system specifications and/or standards for providing a system fully convertible with the existing 8-bit CPU system. To the address data control bus 10 and the 8-bit control bus 12 that are to be a portion of the 8-bit CPU system, there are provided an extension slot 22 for the 8-bit system and a ROM 21 for the 8-bit system. To the slot 22 and ROM 21 are connected a keyboard input device 24 via keyboard controller 23 and a printer 26 via printer interface circuit 25. In addition thereto, there are also provided in the 8-bit CPU 2 a programmable sound generator 27, a calendar timer circuit 28, an RS-232C connection terminal 29 for data transmission, and a floppy disc control circuit 30, by way of the address data bus 10 and the control bus 12. In the extension slot there are also inserted and connected (but not shown) an extension RAM cartridge, an I/O (input/output) connector-cartridge, and a ROM cartridge for playing games or executing simple language software programs.

In operation, when the RAM 6 etc. is accessed by the 8-bit CPU 2, it becomes basically necessary to convert the 16-bit addresses of the 8-bit CPU 2 into a 24-bit address in order to have access to the 64K byte memory area 100 in the 16M byte address space (24-bit address) in FIG. 2. Thus it is necessary to provide an address decoder for this purpose.

In the 8-bit CPU system, a memory device in excess of 64K bytes is controlled by a banking artifice including memory bank commutaion or slot selection.

An example of the memory device control through the slots is hereafter explained. The 64K byte address space of the 8-bit CPU 2 is divided into a page 0, page 1, page 2 and a page 3, each of 16K bytes, so that the memory device in use can be commutated between these pages, while the memory device for commutation can be designated by slot selection. For example, four basic slots each of 64K bytes, can be provided and each of these slots can be further extended into, e.g., four extension slots. The result is that, when each 64K byte is extended to a maximum of 16 slots, the memory device can be used up to 1M byte.

Figure 3:
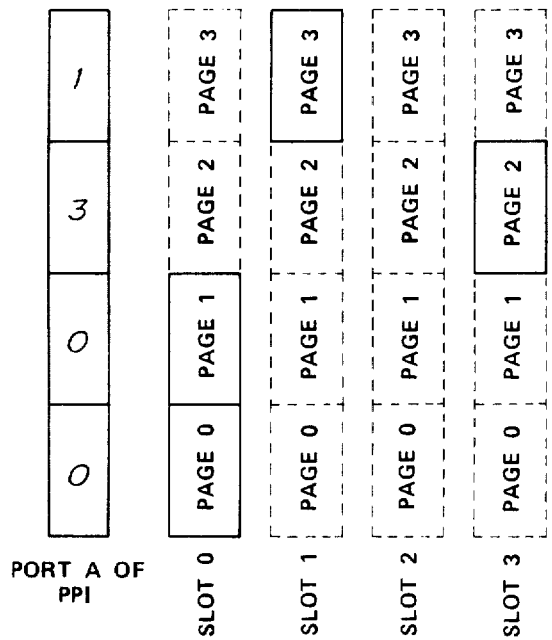
FIG. 3 shows an example of the memory device management for the 8-bit CPU.

It is assumed that these four basic slots are the slots 0, 1, 2 and 3 as shown in FIG. 3. Which slot-page combination should be selected is determined by the data at the output port A of the, e.g., programmable peripheral interface (PPI) 2a as input/output IC of the 8-bit CPU 2. In the example of FIG. 3, the slot 0-pages 0 and 1, slot 1—page 3 and the slot 3—page 2 have been selected. For example, to the 32K bytes of the pages 0 and 1 of the slot 0 is allotted the ROM 21 for the 8-bit CPU system. Similarly, to the 16K bytes of the page 3 of the slot 1 are allotted the 16K bytes in the hatched area in FIG. 2 in the RAM 6 as RAM for the system. In this manner, the memory devices are used in conjunction with page commutation and slot selection.

These memory devices are accessed by the 16-bit CPU 1 through the 64K byte window 101 as described with reference to FIG. 2. The control signal conversion circuit 3 is used for obtaining control signals required for slot selection and page commutation.

The control signal conversion circuit 3 operates to output a portion of address and control signals for the 8-bit CPU 2 on the basis not only of the signals on the control bus 11 of the 16-bit CPU 1 but also of clock signals of the CPUs 1 and 2 or a portion of the address signals on the address and data bus 10. The circuit 3 also operates to convert the response signals of the memory devices from the 8-bit CPU system to the 16-bit CPU system in such a manner that the signal transmission and reception similar to that which will take place when the 8-bit CPU 2 is controlled may take place between the memory devices and the 16-bit CPU 1.

In this manner, there is realized a multiprocessor system which as the 8-bit CPU system will satisfy full convertibility or full compatibility requirements for the specifications and standards for the existing 8-bit personal computer while not obstructing the more excellent functions of the 10-bit CPU system. A portion of the RAM 6 as memory means for the 16-bit CPU system may be used from the side of the 8-bit CPU system in this case while the RAM dedicated to the 8-bit CPU system may be advantageously omitted. Also the memory devices controlled by the 8-bit CPU system may be controlled by the 16-bit CPU 1 through the window 101 in the address space of the 16-bit CPU system, in FIG. 2, so that these memory devices are used in common by the CPU's 1 and 2 resulting in a more elevated utilization efficiency. In addition, during the time the control operation of the large capacity memory devices is being performed at the 8-bit CPU 2 by the banking operation, including bank commutation and slot selection, the 16-bit CPU 1 is not required to procure an area in the address space for each memory device but is able to control all of the memory devices through the 64K byte window 101.

The present invention is not limited to the above embodiment. For example, the processor is not limited to a 16-bit CPU or an 8-BIT CPU, but the processor of the same bit number but with a widely differing functions and/or an address space or more than two processors may be employed. Similarly, the allotting of the address space of the upper rank processor is naturally not limited to the embodiment of FIG. 2.

What is claimed is:

1. A multi-processor system, comprising:
   first processor means having a first address space;
   second processor means having a second address space narrower than said first address space;
   memory means having a memory capacity large enough to be accessed by said first processor means, said memory means having a portion which is allocated to be accessed by said second processor means;
   a multiple line address/data bus having a portion of its lines connected to the first and second processors and to the memory means;
   first accessing means, including the address/data bus and a first control bus connected to the first processor means and the memory means, for providing access to said memory means by said first processor means, and
   second accessing means, including the address/data bus and a second control bus connected to the second processor means and the memory means, for providing access to the portion of the memory means allocated to said second processor means by said second processor means.

2. A multi-processor system according to claim 1, in which said second accessing means comprises slot selection means for managing a plurality of memory slots which are accessible by said second processor means, the portion of the memory means accessible to the second processor means being a selected one of said plurality of memory slots.

3. A multi-processor system according to claim 2, in which each of said memory slots is divided into a plurality of page areas and a predetermined set of page areas in respective memory slots are selected by said slot selection means in accordance with a request from said second processor means.

4. A multi-processor system according to claim 3, in which said second processor means further comprises a programmable peripheral interface for outputting said request to determine a selection of said page areas.

5. A multi-processor system according to claim 1, in which said memory means is controlled by a first control signal from said first processor means through the first control bus and the portion of the memory means which is accessible by the second processor is controlled by a second control signal from said second processor means through the second control bus, and in which said first accessing means comprises control signal conversion circuit means connected between said first and second control buses for converting said first control signal into said second control signal to allow access of said portion of the memory means by said first processor means.

6. A multi-processor system according to claim 5, in which said memory means includes a window area corresponding to the address space of the second processor to enable the first accessing means to access a plurality of memory slots managed by said second processor means.

7. A multi-processor system according to claim 6, in which said window area defines corresponding information to said second address space in said first address space of said first processor means.

8. A multi-processor system, comprising;
   first processor means having a first address space and an operating system,
   second processor means having a second address space which is narrower than said first address space,
   first read only memory means connected with said first processor means for controlling the operating system of said first processor means,
   second read only memory means connected with said second processor means for controlling the operating system of said second processor means,
   random access memory means for storing data therein, said random access memory means having a memory capacity large enough to be accessed by said first processor means and further having a portion which is allocated to be accessed by said second processor means,
   a multiple line address/data bus having a portion of its lines connected to the first and second processors and to the random access memory means;
   first accessing means, including the address/data bus and a first control bus connected to the first processor means and the random access memory means, for accessing said random access memory means by said first processor means; and second accessing means, including the address/data bus and a second control bus connected to the second processor means and the random access memory means, for accessing the portion of said random access memory means allocated to said second processor means by said second processor means.

9. A multi-processor system according to claim 8, in which said random access memory means is controlled by a first control signal from said first processor means sent through the first control bus and said portion of the random access memory means is controlled by a second control signal from said second processor means sent through the second control bus, and in which said first accessing means comprises control signal conversion circuit means connected between said first and second control buses for converting said first control signal into said second control signal to access said portion of the random access memory means by said first processor means.

10. A multi-processor system according to claim 9, in which said second read only memory means and the random access memory means comprise a plurality of memory slots, each of which is managed by said second processor means, and in which said first accesssing means further comprises additional means for accessing said plurality of memory slots managed by said second processor means.

11. A multi-processor system according to claim 10, in which said additional means includes a window area (101) within the random access memory means (6) which defines corresponding information to said second address space in said first address space of said first processor means (1).

* * * * *